Oct. 31, 1933.    G. H. LELAND    1,932,826
SHAFT CONNECTION
Filed Aug. 20, 1928
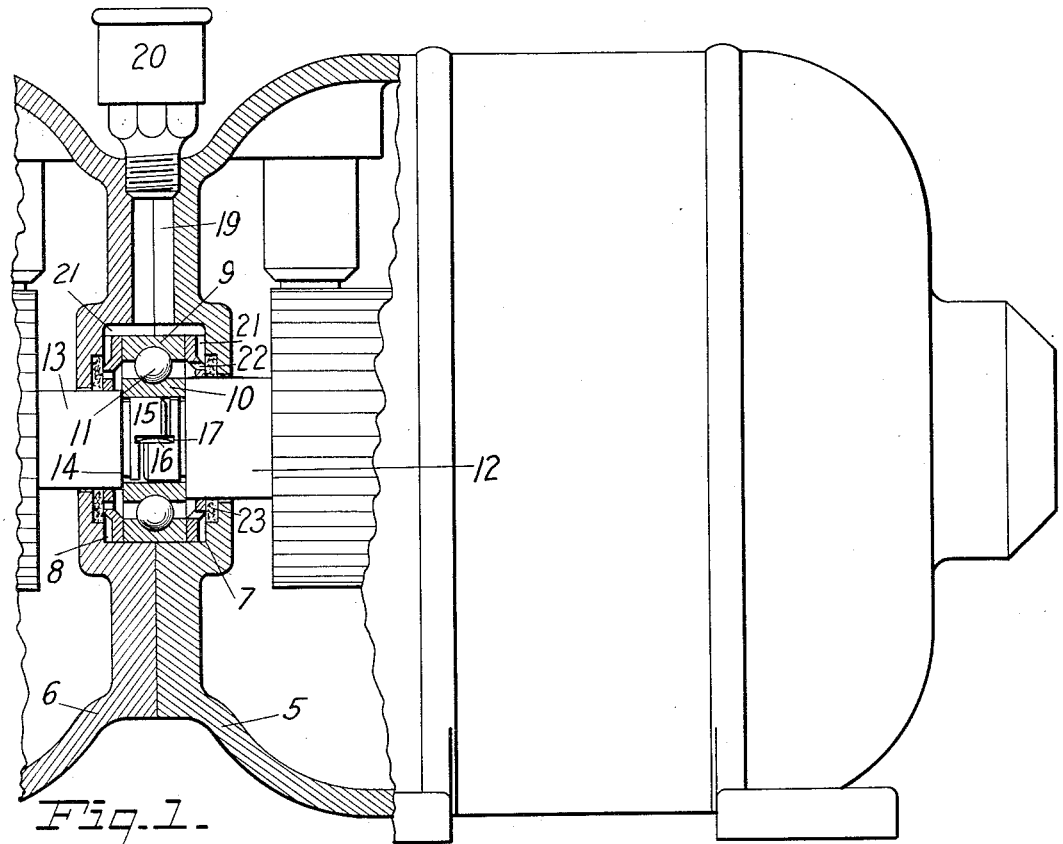
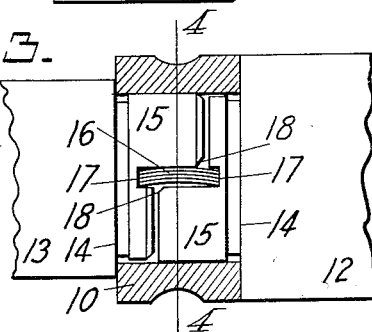
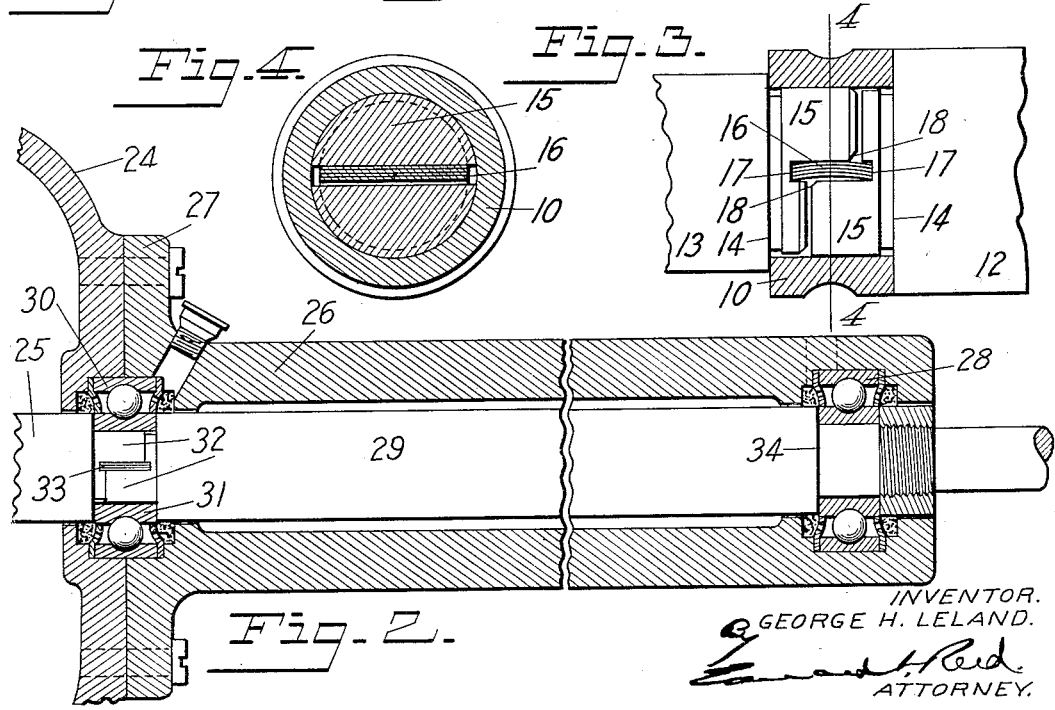
INVENTOR.
GEORGE H. LELAND.
ATTORNEY.

Patented Oct. 31, 1933

1,932,826

UNITED STATES PATENT OFFICE 1,932,826

SHAFT CONNECTION

George H. Leland, Dayton, Ohio, assignor of one-half to The Leland Electric Company, a corporation of Ohio Application August 20, 1928. Serial No. 300,781

12 Claims. (Cl. 64—96)

This invention relates to a driving connection between two units of a power operated mechanism and is designed more particularly for connecting an electric motor of the device which is to be driven thereby.

One object of the invention is to provide means for directly connecting the shafts of two units of a mechanism in such a manner that minor variations from true shaft alinement will not affect the operation of the mechanism.

Another object of the invention is to provide means for rigidly connecting the adjacent ends of the two units with a flexible connection between the shafts of said units.

Another object of the invention is to provide a connection of such a character that any desired number of units may be connected in line, and one or more of said units may be removed without disturbing the other units.

Another object of the invention is to provide such a connection which will be simple in construction, inexpensive to manufacture and easy to assemble.

Other objects of the invention will appear as the device is described in detail.

In the accompanying drawing Fig. 1 is a sectional view of the connection between the two units embodying my invention and showing one of the units partly in elevation; Fig. 2 is a sectional view showing a slightly modified embodiment of the invention; Fig. 3 is a section taken through a portion of the bearing and showing the connected ends of the two shafts in elevation; and Fig. 4 is a transverse section taken on the line 4—4 of Fig. 3.

In the drawing I have illustrated one embodiment of my invention, together with a slight modification thereof, but it will be understood that these embodiments have been chosen for the purposes of illustration only and that the connection may take various forms and may be applied to mechanisms of various kinds.

In that embodiment of the invention illustrated in Fig. 1 the connection is interposed between a motor and a generator driven by that motor. The casing 5 of the motor and the casing 6 of the generator, which constitute supporting structures for the respective units, have their end walls mounted in abutting relation and preferably in direct contact one with the other. Mounted between the end walls of the respective casings is a bearing which is so connected with the respective end walls as to hold the latter against transverse movement with relation one to the other. The bearing may be connected with the ends of the supporting structures in any suitable manner but preferably the ends of the structures are provided with seats in which the respective ends of the bearing are firmly mounted. As here illustrated, the end walls are provided in their outer ends with recesses 7 and 8, which recesses are arranged in line one with the other and constitute seats which receive the bearing.

The bearing may be of any suitable character and, in the present instance, I have employed a ball bearing of a well known type which comprises an outer member or ball race 9, the end portions of which extend into the respective recesses 7 and 8 and are firmly seated therein. The bearing also comprises an inner member or ball race 10 which is rotatable with relation to the outer member 9 and is held against axial movement with relation thereto by the balls 11.

Rotatably mounted in a motor casing 5 is an armature shaft 12, and rotatably mounted in the generator casing 6 is an armature shaft 13. The adjacent end walls of the casing are provided with openings through which the respective shafts extend, these openings being slightly larger than the shafts and being arranged centrally of the respective recesses 7 and 8. The shafts may be supported in the casings in any suitable manner but preferably the outer ends of the two shafts are mounted in the usual bearings in the respective casings and the inner ends of the two shafts extend loosely through the openings in the respective casings into the inner member 10 of the bearing, and are provided at their adjacent ends with means for so connecting the same as to cause the two shafts to rotate in unison. The connection between the shafts has sufficient flexibility to permit of a slight tilting of the shafts with relation one to the other in the event they are not in perfect alinement due to the improper positioning of the casings or of the bearings and the openings in the inner ends of the casing are of such size as to permit of this tilting movement of the shafts.

In the present construction, those portions of the shafts which extend into the bearing are reduced in diameter so as to provide the shafts with shoulders 14 which abut against the ends of the bearing and limit the inward movement of the shafts with relation to the bearing. The means for connecting the two ends of the shafts may take various forms but preferably the shafts are provided at their ends with parts which will be moved into interlocking engagement by the insertion of the shafts in the bearing and will thus connect the shafts for rotation in unison. As here shown, the inner end portion of each shaft is substantially semi-circular in shape, as shown at 15, thus providing each shaft at its inner end with a substantially flat transverse surface, the two surfaces overlapping. Means are provided for exerting radial outward pressure on the adjacent ends of the shafts and this means preferably is in the form of a resilient device interposed between the interlocking parts of the shafts. In the present construction I have arranged between the opposed transverse surfaces of the two shafts a leaf spring 16 consisting of one or more leaves and extending transversely to the shafts. This spring is curved or bowed about a longitudinal axis, that is, about an axis extending transversely to the shafts, and so arranged that it will be placed under compression by the insertion of the shafts in the bearing and will thus tend to move the shafts in radial directions, thereby preventing any chattering or noise and also tending to maintain the shafts in alinement. To facilitate the assembly of the device each shaft is provided at the base of its transverse surface with a transverse recess 17 adapted to receive the adjacent edge of the spring 16. In assembling the mechanism one shaft is inserted in the bearing, with the spring 16 seated in the recess 17 thereof, and the other shaft is then inserted in the bearing from the opposite side and the transverse surface thereof is forced over the spring. Preferably the straight edges of the semi-circular portions of the shafts are slightly beveled, as shown at 18, to facilitate the assembly of the connection.

Any suitable means may be provided for lubricating the bearing and, as here shown, an oil conduit 19 is formed between the abutting ends of the two supporting structures and adapted to receive an oil cup 20. Branch conduits 21 lead from the main conduit 19 and communicate with the bearing through openings 22 in dished washers at the respective ends of the bearing. Preferably a felt washer 23 is interposed between each dished washer and the end wall of the adjacent structure to prevent the escape of lubricant about the shafts.

In Fig. 2 I have shown an installation substantially similar to that above described but applied to a driven unit of a different character. As there shown, the one unit comprises a motor consisting of a casing or supporting structure 24 and a shaft 25. The other unit is supported by the casing 24 of the motor and is shown as comprising an elongated casing 26 having at that end adjacent to the motor a flange or base 27 which is rigidly secured to the motor casing. At its outer end this elongated casing is provided with a ball bearing 28 in which is mounted one end of the shaft 29. The abutting ends of the two casings are recessed to receive a bearing, here shown as a ball bearing consisting of an outer member 30 and an inner rotatable member 31. The ends of the shafts which extend into the inner member of the bearing are semi-circular in shape, as shown at 32, and between the opposed transverse surfaces of these parts of the shafts is interposed a leaf spring.

Lengthwise movement of the shafts of the respective units may be prevented in any suitable manner but ordinarily the ball bearings which support the outer ends of the shafts will also take up the lengthwise thrust on the shafts, this being best shown in Fig. 2 where the shaft 29 is shown as having a shoulder 34 abutting against the inner end of the member 28, this inner member being held against axial movement with relation to the outer member by the balls.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a mechanism of the character described, two supporting structures arranged end to end, a bearing mounted between said structures and held against transverse movement with relation thereto, shafts rotatably mounted in the respective structures, extending into said bearing and having at their adjacent ends and within said bearing overlapping parts to flexibly connect said shafts and cause the same to rotate in unison, and a resilient device interposed between said overlapping parts to exert radial pressure thereon.

2. In a mechanism of the character described, supporting structures arranged end to end, a bearing mounted between the adjacent ends of said structures, shafts rotatably mounted in the respective supporting structures, extending into said bearing and having at their adjacent ends cooperating parts to flexibly connect the same one to the other for rotation in unison, and means to exert radial pressure in different directions on those portions of said shafts which are within said bearing.

3. In a mechanism of the character described, supporting structures arranged end to end, a bearing mounted between the adjacent ends of said structures, shafts rotatably mounted in the respective supporting structures, extending into said bearing and having overlapping parts to flexibly connect the same one to the other, and a resilient device acting on said overlapping parts to exert pressure thereon in opposite directions.

4. In a mechanism of the character described, supporting structures arranged end to end, a bearing mounted between said structures, shafts rotatably mounted in the respective supporting structures, extending into said bearing and having their adjacent end portions provided with overlapping transverse surfaces arranged to permit a limited tilting movement of said end portions with relation one to the other, and a resilient device interposed between said overlapping surfaces to exert radial pressure on said end portions of said shafts.

5. In a mechanism of the character described, supporting structures each having a recess in the end thereof and mounted in abutting relation with said recesses in line one with the other, a bearing comprising a rigid member extending into both of said recesses and fitting tightly therein, shafts rotatably mounted in the respective supporting structures, extending into said bearing and having substantially semi-circular end portions arranged in overlapping relation within said bearing to cause said shafts to rotate in unison and to permit a limited tilting movement thereof with relation one to the other, and a leaf spring interposed between said overlapping end portions of said shafts.

6. In a mechanism of the character described, two supporting structures arranged end to end and having seats in their adjacent ends, a bearing comprising an outer member having its end portions firmly mounted in the respective seats and an inner member rotatable with relation to said outer member, shafts rotatably mounted in the respective structures, extending into the inner member of said bearing and having their inner end portions provided with overlapping transverse surfaces arranged to permit a limited tilting movement of said end portions with relation one to the other, and a resilient device interposed between said overlapping surfaces.

7. In a mechanism of the character described, two supporting structures arranged end to end, a bearing mounted between said structures and connected with both of them, shafts rotatably mounted in the respective structures, extending into said bearing and having at their adjacent ends and within said bearing overlapping parts to cause the same to rotate in unison and to permit limited tilting movement thereof with relation one to the other, and means to exert radial pressure on said overlapping parts.

8. In a mechanism of the character described, two supporting structures arranged end to end, a bearing mounted between said structures, and shafts rotatably mounted in the respective structures, extending into said bearing and having at their adjacent ends parts integral with the respective shafts and arranged in overlapping relation within said bearing to cause said shafts to rotate in unison, said overlapping parts being arranged to permit a limited tilting movement thereof with relation one to the other.

9. In a mechanism of the character described, two supporting structures arranged end to end, a bearing mounted between said structures and shafts rotatably mounted in the respective structures, extending into said bearing and having at their adjacent ends parts integral with the respective shafts and arranged within said bearing in opposed relation one to the other to connect said shafts for rotation in unison and having their opposed surfaces spaced apart to permit a slight tilting movement of said shafts with relation one to the other.

10. In a mechanism of the character described, two supporting structures arranged end to end, a bearing mounted between said structures, and shafts rotatably mounted in the respective supporting structures, extending into said bearing and having substantially semi-circular end portions arranged in overlapping relation within said bearing to connect said shafts one to the other for rotation in unison and with sufficient clearance between their opposed surfaces to permit a limited tilting movement of said shafts with relation one to the other.

11. In a mechanism of the character described, two supporting structures arranged end to end and having seats in their adjacent ends, a bearing having its end portions supported in the respective seats and held against movement with relation thereto, and shafts rotatably mounted in the respective structures, extending into said bearing and having at their adjacent ends parts integral with the respective shafts and arranged within said bearing in opposed relation to connect said shafts one to the other for rotation in unison, and to permit a limited tilting movement of said shafts with relation one to the other.

12. In a mechanism of the character described, supporting structures each having a recess in the end thereof, and mounted in abutting relation with said recesses in line one with the other, a bearing comprising a rigid member extending into both recesses and fitting tightly therein, and shafts rotatably mounted in the respective supporting structures, extending into said bearing and having at their adjacent ends, within said bearing, parts integral with the respective shafts and arranged in overlapping relation to connect said shafts for rotation in unison and to permit a limited tilting movement of said shafts with relation one to the other.

GEORGE H. LELAND.